United States Patent [19]

Mondrush

[11] Patent Number: 4,495,887
[45] Date of Patent: Jan. 29, 1985

[54] SEAT

[76] Inventor: Ronald L. Mondrush, 37819 Rhonswood, Northville, Mich. 48167

[21] Appl. No.: 971,357

[22] Filed: Dec. 20, 1978

[51] Int. Cl.³ .............................................. A47C 13/00
[52] U.S. Cl. ...................................... 297/118; 5/37 R
[58] Field of Search .................. 297/118, 112, 355, 62, 297/238; 5/43, 37 C, 37 R

[56] References Cited

U.S. PATENT DOCUMENTS

| 22,722 | 1/1859 | Gardner | 297/112 |
|---|---|---|---|
| 941,186 | 11/1909 | Brown | 5/37 C |
| 2,320,614 | 6/1943 | Kleine | 5/37 R X |
| 2,377,649 | 6/1945 | Quinney | 297/118 X |
| 2,634,429 | 4/1953 | Hopeman, Jr. et al. | 297/118 X |
| 2,937,382 | 5/1960 | Laemmle et al. | 5/37 C |

Primary Examiner—Francis K. Zugel
Assistant Examiner—Peter A. Aschenbrenner
Attorney, Agent, or Firm—Barnes, Kisselle, Raisch, Choate, Whittemore & Hulbert

[57] ABSTRACT

A seat for a van or the like including auxiliary seat structure pivotally mounted on seat back structure wherein the seat back structure and auxiliary seat structure are selectively movable into and out of a substantially vertical position with the auxiliary seat structure positioned behind the seat back structure and engaged with a floor to which the seat is secured at an angle to prevent pivotal movement of the seat back structure into a horizontal position and a substantially horizontal position wherein seat bottom structure, the seat back structure and the auxiliary seat structure are aligned in substantially the same horizontal plane. The seat back structure and auxiliary seat structure are automatically, releasably locked in the substantially vertical position thereof on movement of the seat back structure and auxiliary seat structure into the substantially vertical position thereof.

11 Claims, 17 Drawing Figures

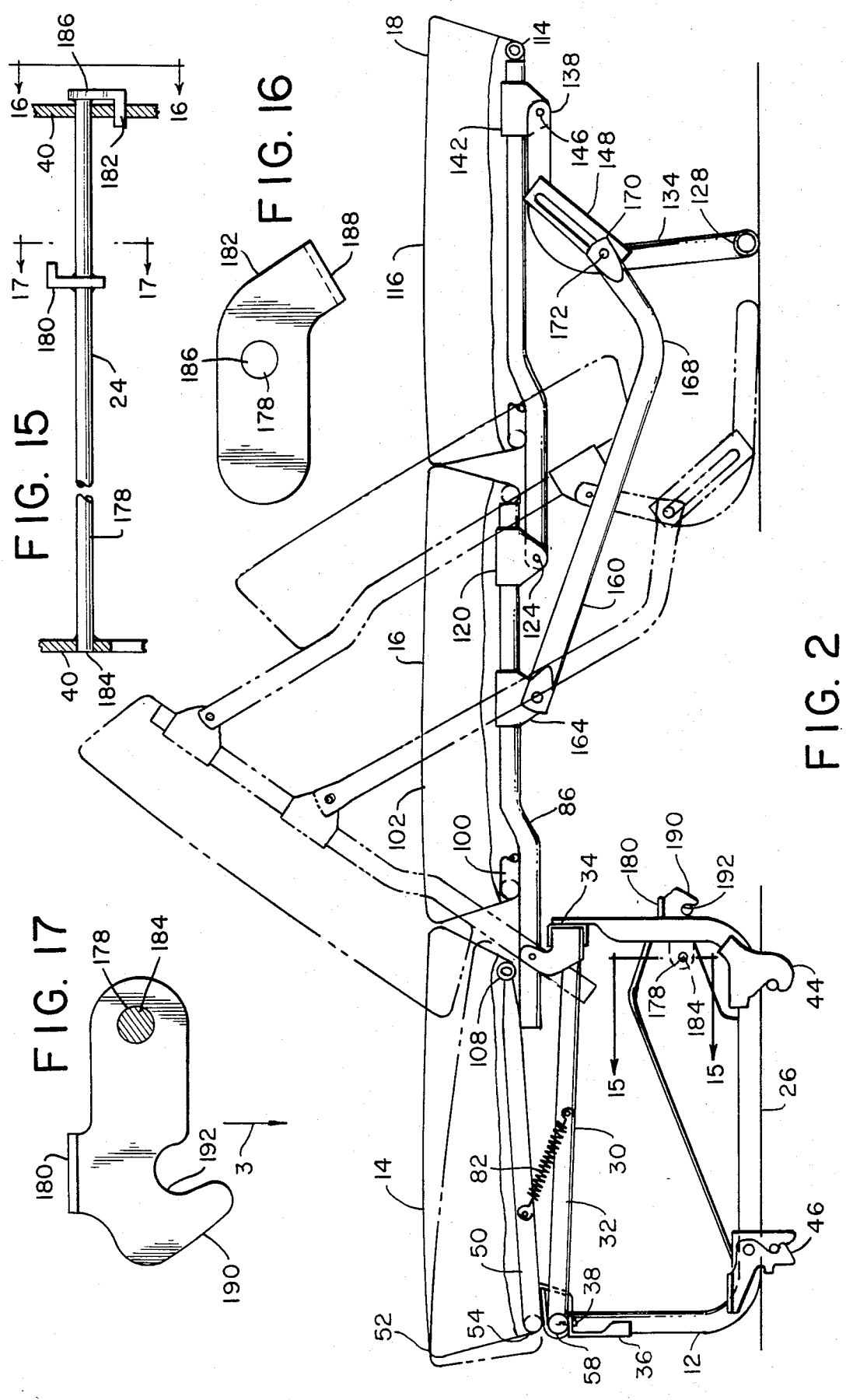

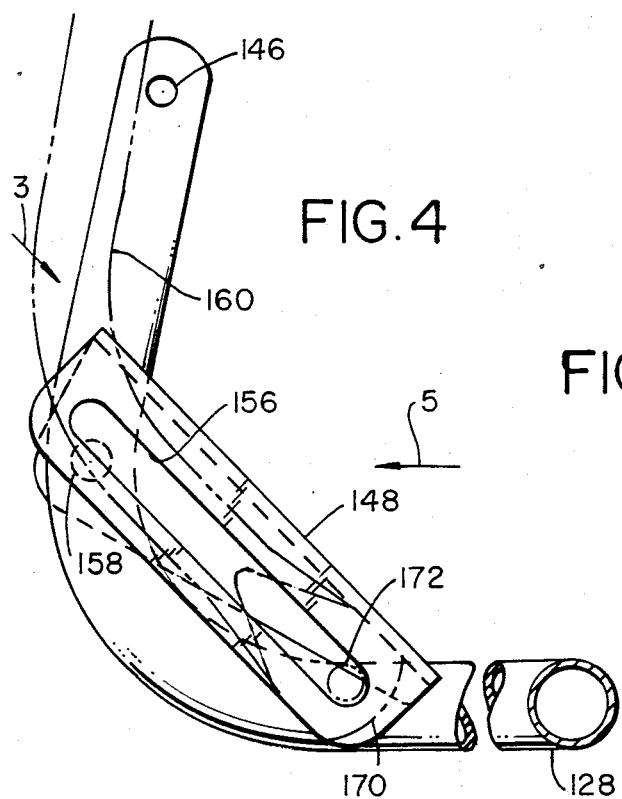
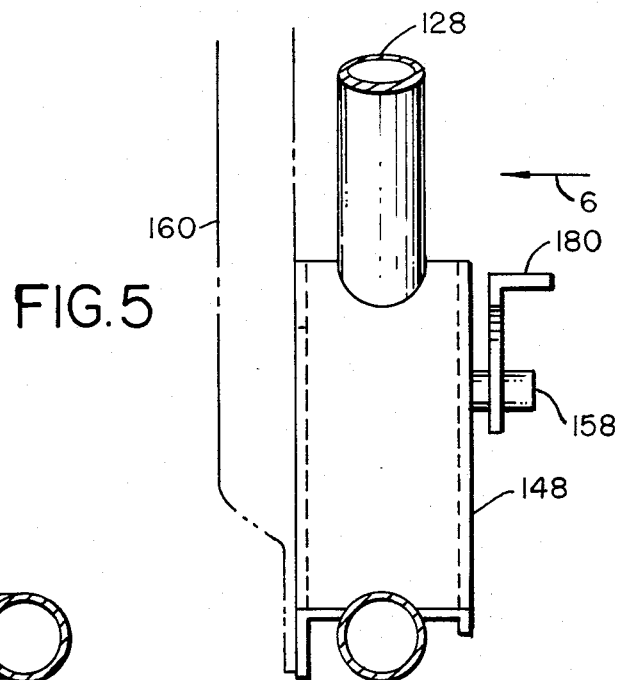
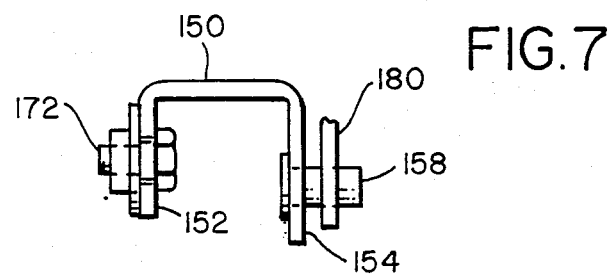
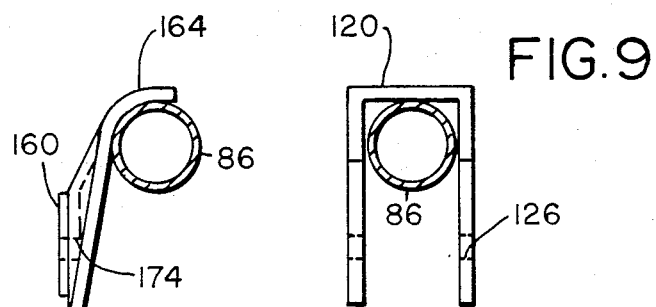
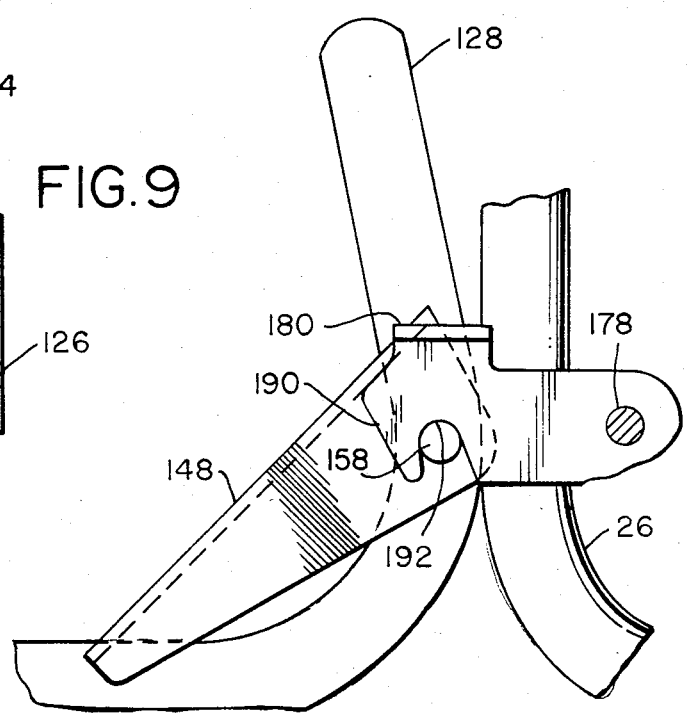

SEAT

BACKGROUND OF THE INVENTION

1. Field of the Invention

The invention relates to vehicle seats and the like and refers more particularly to a seat particularly suitable for use with a van, including auxiliary seat structure pivotally mounted to seat back structure, wherein the seat back structure and auxiliary seat structure are selectively movable into substantially vertical positions wherein the seat back structure is in a normal seat back position and the auxiliary seat structure is positioned behind the seat back structure to provide support therefor against pivotal movement of the seat back structure into a horizontal position in which positions the seat back structure and auxiliary seat structure are automatically and releasably locked, and substantially horizontal positions wherein the seat back structure and auxiliary seat structure are aligned with each other and seat bottom structure and supported in such position to provide an unbroken substantially horizontal surface.

2. Description of the Prior Art

In the past, reclining vehicle seats have been known which have permitted the seat back structure to pivot into a substantially horizontal position to allow relaxation of a passenger. Further, auxiliary members have been provided for use in vans and the like and in conjunction with van seat structure to provide sleeping accommodations. Such structures of the past have generally been separate structures often requiring tools to assemble or disassemble. Wherein such structures of the past have been provided with a seat in a single unit, they have often been particularly complicated and therefore expensive to produce and often inefficient in use.

SUMMARY OF THE INVENTION

The seat of the invention comprises a seat base adapted to be secured to the floor of a vehicle, seat bottom structure positioned on the seat base, means for urging the seat bottom structure rearwardly of the seat while permitting limited relative horizontal movement of the seat bottom structure with respect to the seat base and limited pivotal movement of the seat bottom structure about the lower front edge thereof on arcuate movement of the back of the seat bottom structure, seat back structure pivotally supported by the seat base for movement into and out of a substantially vertical normal seat back position and a substantially horizontal position substantially aligned with the seat bottom structure, auxiliary seat structure pivotally mounted on the seat back structure for movement between a substantially vertical position wherein it aids in preventing undesired pivotal movement of the seat back structure into the horizontal position and a substantially horizontal position aligned with the seat back structure and seat bottom structure in the substantially horizontal position thereof, support structure pivotally secured to the auxiliary seat structure operable to aid in bracing of the seat back structure in the substantially vertical position thereof and to provide support for the auxiliary seat structure in a horizontal position thereof, and linkage means pivotally connected to the seat back structure and to the support structure in a lost motion connection for guiding the auxiliary seat structure and seat back structure between the substantially vertical positions and horizontal positions thereof.

The seat of the invention further includes automatic latching means for releasably locking the seat back structure and auxiliary seat structure in the substantially vertical positions thereof on movement of the seat back structure and auxiliary seat structure into the substantially vertical positions thereof.

BRIEF DESCRIPTION OF THE DRAWINGS

FIG. 2 is a side elevation of the seat of FIG. 1, showing the seat structures in a substantially horizontal position in solid lines, and showing the seat structures in an intermediate position between the substantially vertical positions of the seat structures of FIG. 1, and the substantially horizontal positions of the seat structures of FIG. 2 in phantom.

FIG. 4 is an enlarged, partial elevation view of the lost motion connection between the support structure and the linkage means of the seat of FIGS. 1 through 3, with the link of the linkage means shown in phantom.

FIG. 5 is a view of the portion of the seat shown in FIG. 4, taken substantially in the direction of arrow 5 in FIG. 4.

FIG. 6 is a view of the portion of the seat shown in FIG. 5, taken substantially in the direction of arrow 6 in FIG. 5.

FIG. 7 is a view of the portion of the seat shown in FIG. 5, taken substantially in the direction of arrow 7 in FIG. 5.

FIG. 8 is an enlarged, partial cross section of the seat illustrated in FIG. 1, taken substantially on the line 8—8 in FIG. 1.

FIG. 9 is an enlarged, partial cross section of the seat illustrated in FIG. 1, taken substantially on the line 9—9 in FIG. 1.

FIG. 15 is a partial section view of the seat of FIG. 2 taken substantially on the line 15—15 of FIG. 2 and particularly showing the latch release mechanism.

FIG. 16 is an enlarged end view of the latch release structure of the invention taken along the line 16—16 in FIG. 15

FIG. 17 is an enlarged section view of the latch release structure illustrated in FIG. 15 taken substantially on the line 17—17 in FIG. 15.

DESCRIPTION OF THE PREFERRED EMBODIMENT

Figure 1:
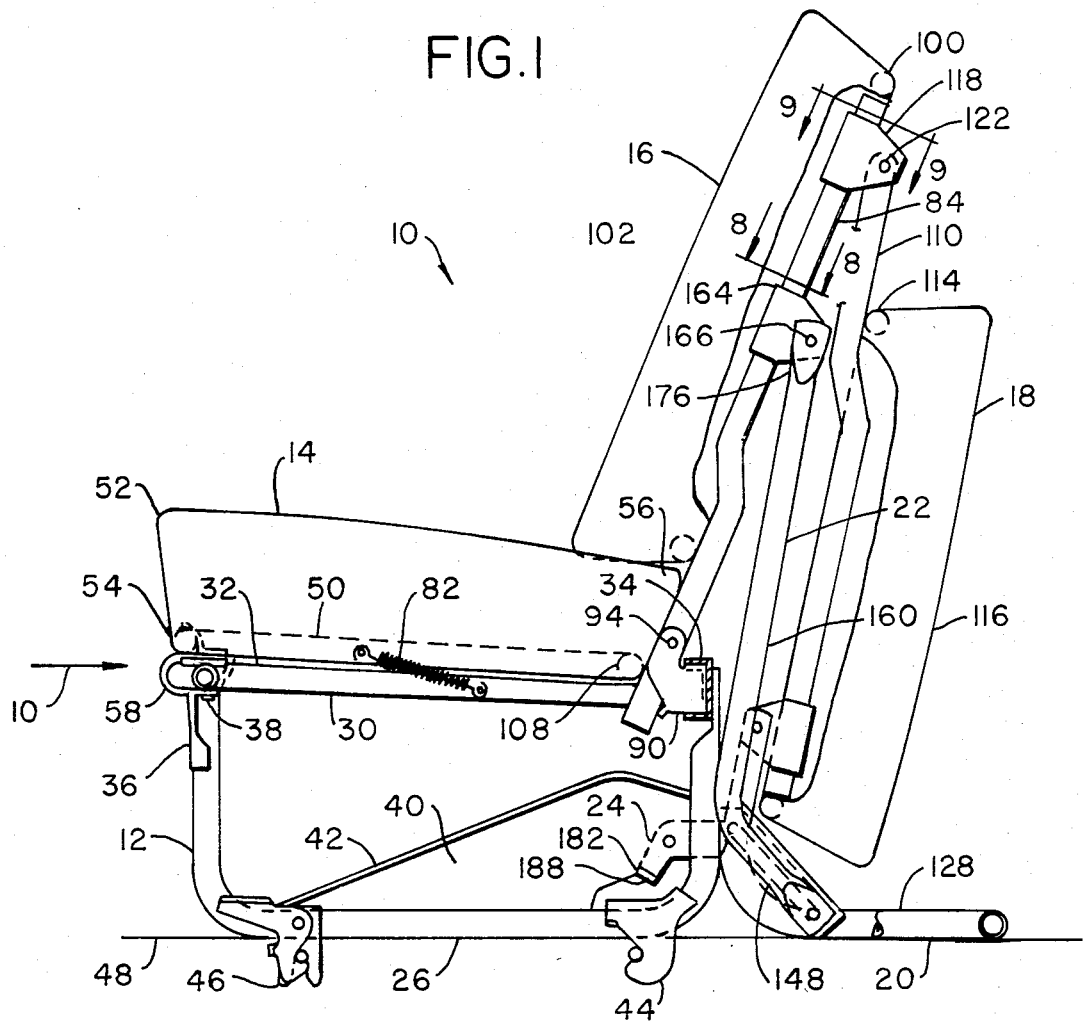
FIG. 1 is a side elevation of a seat constructed in accordance with the invention, with the seat structures in substantially vertical positions.

The seat 10 includes a seat base 12, seat bottom structure 14, seat back structure 16, auxiliary seat structure 18, support structure 20 and linkage means 22. Releasable latching means 24 is provided between the support structure 20 and seat base 12.

More specifically, the seat base 12 includes a pair of horizontally spaced apart tubular U-shaped members 26 and 28 and a generally rectangular frame 30 including a tubular U-shaped member 32 forming the front and sides thereof and a channel member 34 forming the back thereof connected by convenient means such as welding, not shown. The tubular U-shaped members 26 and 28 are secured to the rectangular frame 30 at the free ends of the vertically extending leg portions of the U-shaped members by convenient means such as bracket 36 and screw 38 and/or welding, as desired. Bracing members 40 shaped in elevation as shown best in FIG. 1 and having a reinforcing flange 42 thereon are provided in conjunction with the U-shaped tubular members 26 and may be secured thereto by convenient means such as welding. Known mounting brackets 44 and 46 by which the seat structure 10 may be secured to a van floor 48 through slots therein are secured to the tubular members 26 and 28 at the opposite sides of the seat structure 10, also by convenient means such as welding.

The seat bottom structure 14 includes a generally tubular frame 50 and a bottom seat cushion 52 constructed thereon. The seat bottom structure 14 is secured to the base 12 for limited horizontal movement with respect thereto. Pivotal movement of the seat bottom structure 14 about the lower front edge 54 thereof on arcuate movement of the rear 56 of the seat bottom structure 14 in a counterclockwise direction as shown in FIG. 1 is also permitted.

Figure 10:
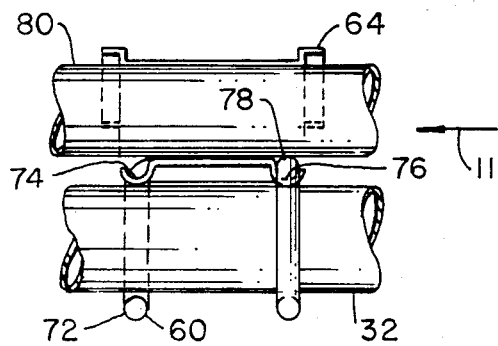
FIG. 10 is an enlarged elevation view of a portion of the seat illustrated in FIG. 1, taken substantially in the direction of arrow 10 in FIG. 1.
Figure 11:
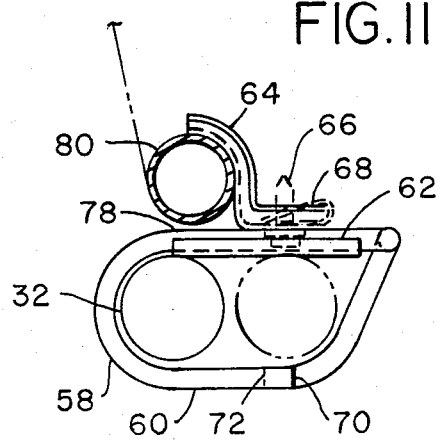
FIG. 11 is a view of the portion of the seat illustrated in FIG. 10, taken substantially in the direction of arrow 11 in FIG. 10.

The structure 58 for permitting limited horizontal and pivotal movement of the seat bottom structure 14 while retaining the seat bottom structure 14 on the seat base 12 is shown best in FIGS. 10 and 11, and includes a spring clip 60, plate 62, bracket 64, retaining screw 66 and fastener 68. As shown, the spring clip 60 is a single member starting at end 70 which is bent into the shape shown in FIGS. 10 and 11 and which terminates at the end 72. The spring clip 60 is positioned over the front portion of the tubular member 32. The spring clip 60 is thus movable horizontally between the two positions relative to the tubular member 32 shown in FIG. 11 and is pivotal about the tubular member 32 on angular movement of the seat bottom structure 14 about the front lower edge 54 thereof.

The plate 62 as shown best in FIG. 10 is formed with side recesses 74 and 76, one of which receives a portion 78 of the spring clip 60. The bracket 64, shaped as shown in FIGS. 10 and 11, is secured to the plate 62 by the retaining screw 66 and fastener 68. The front portion 80 of the frame 50 of the seat bottom structure 14 is held in engagement with the bracket 64 by a resilient spring 82 operable between the frame 30 of the base 12 and the frame 50 of the seat bottom structure 14.

Figure 3:
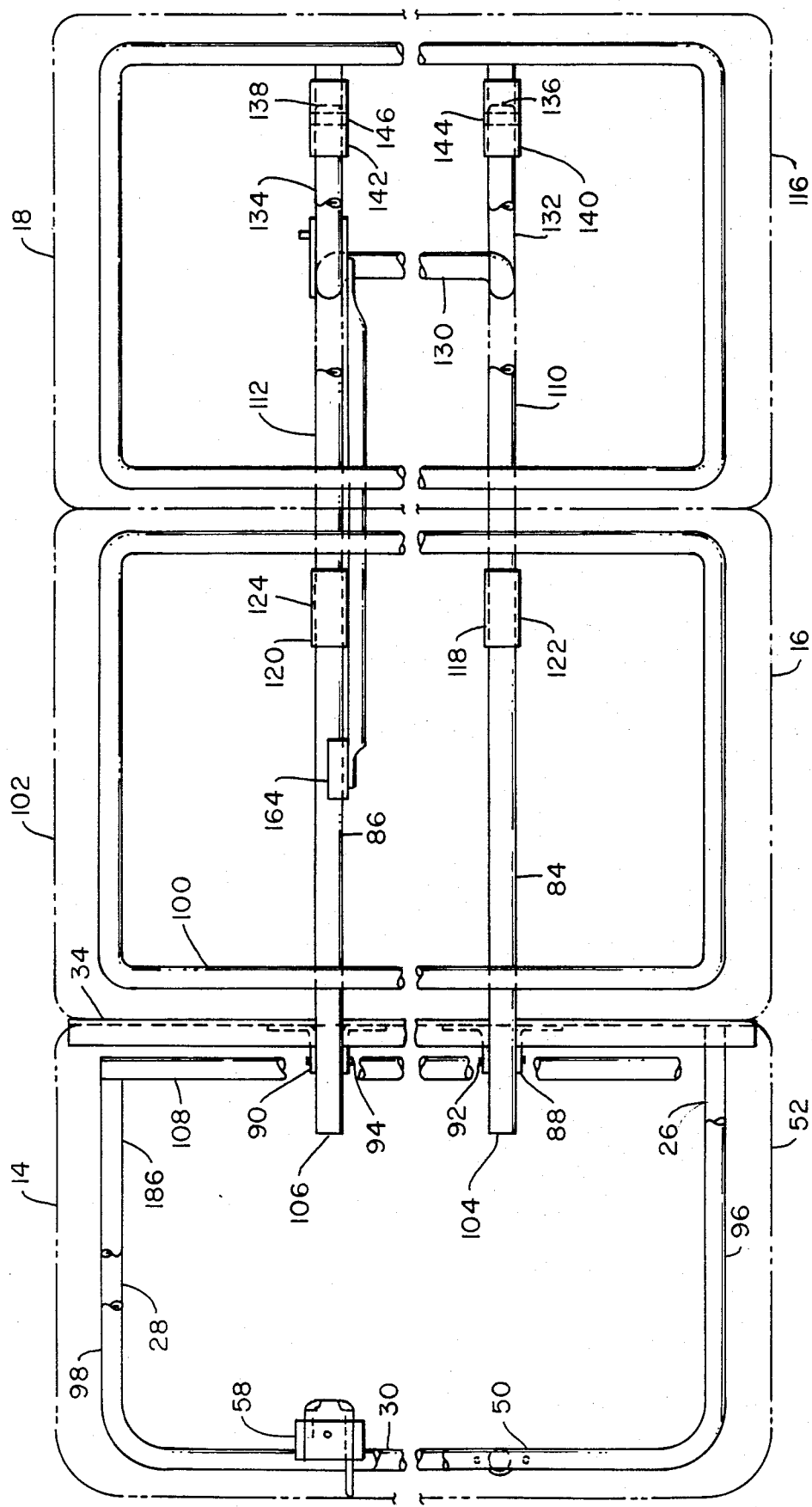
FIG. 3 is a top view of the seat illustrated in FIGS. 1 and 2, with the seat as shown in full lines in FIG. 2, taken substantially in the direction of arrow 3 in FIG. 2 and showing the seat cushions in phantom.

The seat back structure 16 includes the seat back supporting members 84 and 86 secured to the base 12 by brackets 88 and 90 welded to the channel 34 of the seat base 12 and the pivot means 92 and 94, respectively. The supporting members 84 and 86 are spaced inwardly of the seat structure from the sides 96 and 98 of the seat bottom structure 50, as shown best in FIG. 3. The seat back structure 16 further includes the tubular rectangular frame 100 secured to the supporting members 84 and 86 by convenient means such as welding, brackets and/or screws, not shown. Seat cushion structure 102 is constructed on the rectangular frame 100, again as shown in FIGS. 1–3.

The seat back structure 16 is pivotal about the pivot means 92 and 94 from a substantially vertical position, as shown in FIG. 1, through the intermediate position shown in phantom in FIG. 2, into the substantially horizontal position shown in solid lines in FIG. 2. During such pivotal movement, the extended lower ends 104 and 106 of the seat back supporting members 84 and 86 below the pivot means 92 and 94 in FIG. 1 are caused to engage the back portion 108 of the frame 50 of the seat bottom structure 14 and to pivot the back 56 of the seat bottom structure 14 counterclockwise as shown in FIG. 1. Such pivotal movement further permits the seat bottom structure 14 to move substantially horizontally toward the back 56 thereof under the influence of the spring 82 to the limit allowed by the spring clip 60. The seat bottom structure 14 will thus be moved from the position shown in solid lines in FIG. 1 through the position shown in phantom in FIG. 2 to the position shown in solid lines in FIG. 2 so that the seat bottom structure 14 and the seat back structure 16 provide a continuous, substantially horizontal top surface, as shown best in FIG. 2.

On reverse, that is, counterclockwise, pivoting of the seat back structure 16 from its horizontal position as shown in FIG. 2, the seat back structure 16 and the seat bottom structure 14 return to the position shown in FIG. 1.

The auxiliary seat structure 18 includes the auxiliary seat structure supporting members 110 and 112, a tubular rectangular frame 114 and a cushion 116 constructed on the rectangular frame 114. The supporting members 110 and 112 are pivotally secured to the seat back structure 16 by means of the brackets 118 and 120 and the pivot means 122 and 124 shown best in FIG. 9. As shown in FIG. 9, the brackets 118 and 120 are substantially U-shaped, having transverse openings 126 therethrough to receive the pivot means 122 and 124 therein. The brackets 118 and 120 may be secured to the seat back supporting members 84 and 86 by convenient means such as welding.

The auxiliary seat structure 18 may be pivoted about the pivot means 122 and 124 from a substantially vertical position thereof, as shown in FIG. 1, through the intermediate position shown in phantom in FIG. 2 into a substantially horizontal position thereof as shown in solid lines in FIG. 2, in which position the cushion 116 is substantially aligned with the cushions 102 and 52 of the seat back structure and the seat bottom structure in the horizontal position thereof. Collapsing of the seat when lowered into the substantially horizontal position is prevented by locating the pivot brackets 118 and 120 on the seat back structure 100 so that the upper portion of the seat back structure 100 comes to rest and is supported on members 110 and 112 of the auxiliary seat structure 18.

In the substantially vertical position of the auxiliary seat structure 18, as shown in FIG. 1, the auxiliary seat structure 18 and in particular the supporting members 110 and 112 thereof in conjunction with the support structure 20 provide a brace which prevents undesired clockwise pivotal movement of the seat back structure 16.

The support structure 20 includes a generally U-shaped tubular supporting member 128 having the connecting portion 130 and the leg portions 132 and 134. The leg portions of the supporting member 128 are bent at an angle slightly greater than 90°, as shown best in FIGS. 1 and 2. The free ends 136 and 138 of the supporting member 128 are pivotally secured to the supporting members 110 and 112 of the auxiliary seat structure 18 by brackets 140 and 142 and by pivot means 144 and 146, respectively. Brackets 140 and 142 may be the same as brackets 118 and 120 and may be secured to the supporting members 110 and 112 by convenient means such as welding.

The supporting member 128 is pivoted clockwise from the position shown in FIG. 1 through the position shown in phantom in FIG. 2 into the position shown in solid lines in FIG. 2 on movement of the auxiliary seat structure 18 from the substantially vertical position shown in FIG. 1 into the substantially horizontal position shown in FIG. 2. In the position shown in FIG. 1, the support structure 20 aids in bracing the seat back structure 16 against undesired clockwise pivotal movement as indicated above. In the position shown in solid lines in FIG. 2, the support structure 20 in conjunction with the seat base 12 supports the seat 10 on the floor 48.

Support structure 20 further includes the guide bracket 148, best shown in FIGS. 4-7. As shown, the bracket 148 is substantially U-shaped having a connecting portion 150 and the leg portions 152 and 154. Leg portion 152 includes the elongated slot 156 therein. A locking stud 158 is secured to the other leg 154 of the bracket 148. Bracket 148 is secured to the leg 134 of the supporting member 128 at the bend therein by convenient means such as welding.

The bracket 148 aids in control of movement of the seat 10 between the position shown in FIG. 1 and the position shown in solid lines in FIG. 2 in conjunction with the linkage means 22 and in the locking of the auxiliary seat structure 18 in the substantially vertical position as shown best in FIG. 1 in conjunction with the latching means 24, as will be seen subsequently.

The linkage means 22 includes the link 160, bracket 164 shown best in FIG. 8, and pivot means 166. The link 160 is a tubular member having substantially flat ends and bent at point 168, as shown in FIG. 2, at approximately 45°. The end 170 of link 160 is connected by pivot means 172 to the bracket 148. Pivot means 172 slides in slot 156 as well as permitting pivotal movement of the end 170 about the pivot means 172. The bracket 164, as shown best in FIG. 8, is a stamped member having opening 174 extending therethrough through which the pivot means 166 connecting the end 176 of the link 160 to the bracket 164 extends.

In operation, the link 160 moves from the substantially vertical position thereof as shown in FIG. 1, through the intermediate position shown in phantom in FIG. 2, into the solid line position shown in FIG. 2, during movement of the seat back structure, seat bottom structure and auxiliary seat structure into horizontal alignment, as shown in solid lines in FIG. 2. The link 160 with the bracket 148 insures the proper movement of the supporting member 128 during movement of the seat 10 from the position shown in FIG. 1 to the solid line position shown in FIG. 2. Further, the link 160 together with the supporting member 128 aids in bracing the seat back structure 16 against undesired clockwise pivoting with the seat structure 10 in the position illustrated in FIG. 1.

The latching means 24 includes an elongated rod 178 extending between the brackets 40 of the seat base 12 and the latch 180 secured to the rod 178 adjacent the bracket 90 and on the side thereof toward the edge 98 of the seat bottom structure 14. The latch 180 is rigidly secured to the rod 178 by welding for angular movement about the longitudinal axis of the rod on application of torque to one end of the rod to twist the rod about the axis thereof. A lever handle 182 is secured to the rod 178 at the edge of the seat 98, as shown in FIG. 1. The end 184 of the rod 178 is rigidly secured to the bracket 40 at the lower end thereof, as shown in FIG. 3. The end 186 extends through the bracket 40 at the top end, as shown in FIG. 2.

Thus, on rotation of the lever 182 counterclockwise as shown in FIG. 1, the end 186 of the rod 178 is caused to rotate about the longitudinal axis thereof to rotate the latch 180 counterclockwise angularly to release the latch stud 158 on the bracket 148 to permit movement of the seat 10 from the position shown in FIG. 1 into the solid line position shown in FIG. 2. On release of the handle 182, the stress on the rod 178 occasioned due to the twisting of the end 186 thereof with the end 184 held in a fixed position, will cause the latch 180 to return to the locking position shown in FIGS. 5 and 6. Further, clockwise movement of the latch 180 is prevented by the flange 188 on the lever 182 engaging the adjacent bracket 40.

When the seat 10 is again returned to the position shown in FIG. 1, the locking stud 158 will engage the inclined surface 190 of the latch 180 to pivot the latch 180 counterclockwise until the locking stud 158 drops into the locking recess 192 provided in the latch 180. The seat structure 10 is thus automatically releasably locked in the position illustrated in FIG. 1 until the latch 180 is again rotated by the lever 182 when it is desired to move the seat 10 into the position shown in FIG. 2.

Figure 12:
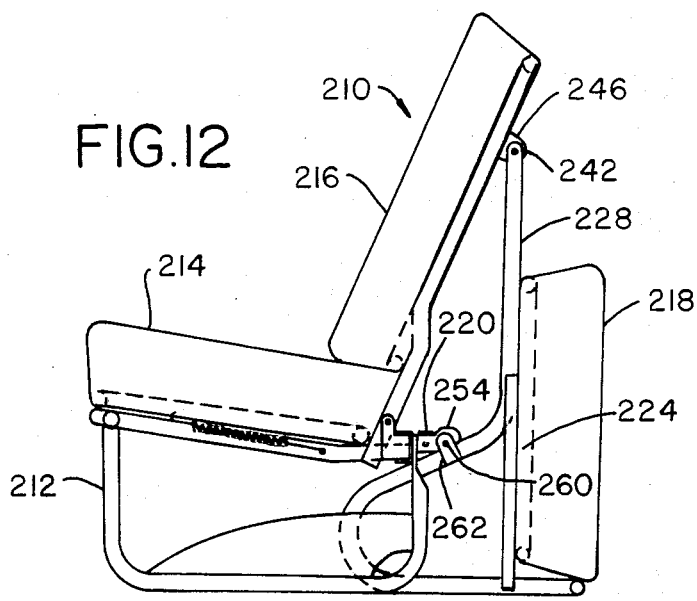
FIG. 12 is a side elevation of a modified seat constructed in accordance with the invention, with the back and auxiliary seat structures in substantially vertical positions.
Figure 13:
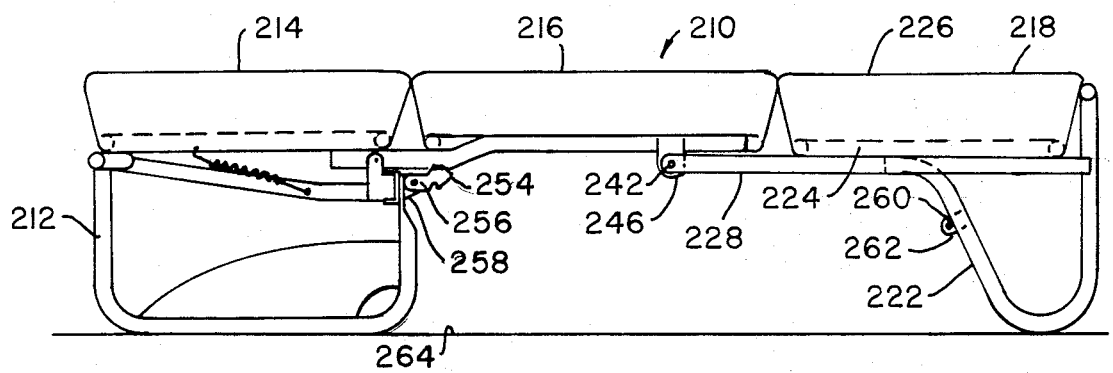
FIG. 13 is a side elevation of the modified seat of FIG. 12 showing the back and auxiliary seat structures in a substantially horizontal position.
Figure 14:
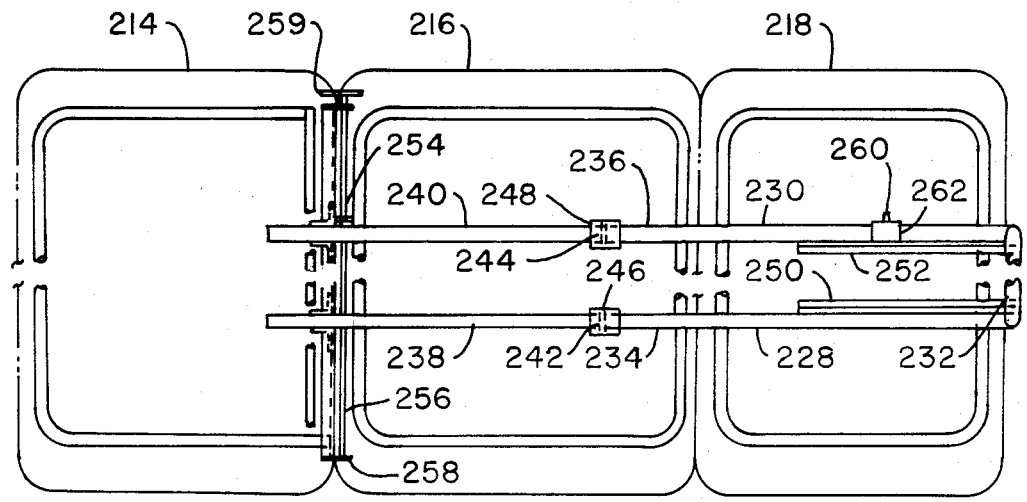
FIG. 14 is a top view of the modified seat illustrated in FIGS. 12 and 13, taken substantially in the direction of the arrow 14 in FIG. 13.

The modified seat structure 210 illustrated in FIGS. 12-14 includes a seat base 212, seat bottom structure 214, seat back structure 216, auxiliary seat structure 218 and releasable latching means 220. The seat base 212, seat bottom structure 214 and seat back structure 216 are the same as the seat base 12, seat bottom structure 14 and seat back structure 16 of the seat 10 described above and will not therefore be considered in detail again.

The auxiliary seat structure 218 in the modified seat 210 includes auxiliary seat support means 222, a tubular rectangular frame 224, and a cushion 226 constructed on the rectangular frame 224.

The auxiliary seat support means 222 is generally U-shaped having legs 228 and 230 shaped as shown best in FIG. 13 at the opposite sides thereof and having a connecting portion 232 extending therebetween as shown best in FIG. 14. The ends 234 and 236 of the legs 228 and 230 are secured to the seat back supporting members 238 and 240 of the seat back structure 216 by convenient pivot means 242 and 244 and brackets 246 and 248. Reinforcing channels 250 and 252 are secured to legs 228 and 230 by convenient means such as welding, as shown best in FIGS. 13 and 14.

The releasable latching means 220 includes a latch 254 supported on a rod 256 carried in brackets 258 at the opposite sides of the seat base 212. The releasable latching means 220 further includes a locking stud 260 secured to the leg 230 of the auxiliary seat support means 218 by convenient means such as the bracket 262. As before, the rod 256 is fixed in the bracket 258 at one side of the seat 210 and is rotatable by convenient means 259 at the other side of the seat 210 whereby the latch 254 is resiliently urged into the position shown in FIG. 13.

In operation of the modified seat 210, when the seat back structure 216 and the auxiliary seat structure 218 are moved into the position shown in FIG. 13, the auxiliary seat support means 222 supports the auxiliary seat structure 218 from the floor 264 of a van or the like. When the seat 210 is moved into the position shown in FIG. 12, with the seat back structure 216 and auxiliary seat structure 218 in a substantially vertical position, the auxiliary seat support means 222 braces the seat back structure 216 against movement into the horizontal position.

Also, as before, the latch 254 automatically cams over the locking stud 260 to secure the seat 210 in the position shown in FIG. 12. To again move the seat 210 into the position shown in FIGS. 13 and 14, it is then necessary to rotate the latch 255 counterclockwise as shown in FIG. 13.

While one embodiment and a modification of the seat of the invention has been described in detail, it will be understood that other embodiments and modifications thereof are contemplated by the inventor. Thus, for example, the length of the horizontal surface of the seat structure 10 in the position shown in FIG. 3 may be increased or decreased by changing the length of the auxiliary seat structure 18. It is the intention to include all embodiments and modifications of the seat of the invention as are defined by the appended claims within the scope of the invention.

What is claimed is:

1. A seat comprising a seat base including U-shaped members at each side thereof, a rectangular frame secured to the free ends of the U-shaped members and means for securing the U-shaped members at the connecting portions thereof to the floor of a van or the like, seat bottom structure including a generally rectangular frame, a seat cushion constructed on the seat bottom structure frame, a clip secured to the rectangular frame of the seat base at the front thereof in a lost motion connection and in engagement with the seat bottom structure frame at the front thereof permitting limited relative horizontal movement between the seat base and seat bottom structure and pivotal movement of the seat bottom structure about the front lower edge thereof, resilient means operable between the seat base and seat bottom structure for urging the seat bottom structure backward on the seat base, seat back structure including seat back supporting members pivotally mounted on the seat base having portions extending above the seat bottom structure for supporting a seat back cushion and portions extending below the seat bottom structure for engaging the seat bottom structure to pivot the back of the seat bottom structure up and allowing it to move backward on pivoting of the seat back structure into a horizontal position, a seat back structure rectangular frame secured to the seat back structure supporting members and a seat back cushion constructed on the seat back structure frame, auxiliary seat structure including auxiliary seat structure supporting a rectangular frame secured to the auxiliary seat structure supporting members and an auxiliary seat structure cushion constructed on the auxiliary seat structure frame, and releasable locking means secured to the seat base and auxiliary seat structure and automatically, releasably engageable on movement of the seat back structure and auxiliary seat structure into the substantially vertical positions thereof.

2. A seat comprising a seat base including U-shaped members at each side thereof, a rectangular frame secured to the free ends of the U-shaped members and means for securing the U-shaped members at the connecting portions thereof to the floor of a van or the like, seat bottom structure including a generally rectangular frame, a seat cushion constructed on the seat bottom structure frame, a clip secured to the rectangular frame of the seat base at the front thereof in a lost motion connection and in engagement with the seat bottom structure frame at the front thereof permitting limited relative horizontal movement between the seat base and seat bottom structure and pivotal movement of the seat bottom structure about the front lower edge thereof, resilient means operable between the seat base and seat bottom structure for urging the seat bottom structure backward on the seat base, seat back structure including seat back supporting members pivotally mounted on the seat base having portions extending above the seat bottom structure for supporting a seat back cushion and portions extending below the seat bottom structure for engaging the seat bottom structure to pivot the back of the seat bottom structure up and allowing it to move backward on pivoting of the seat back structure into a horizontal position, a seat back structure rectangular frame secured to the seat back structure supporting members and a seat back cushion constructed on the seat back structure frame, auxiliary seat structure including auxiliary seat structure support means including a U-shaped member having legs the free ends of which are pivotally connected to the seat back support members and which extend a short distance in aligned engagement therewith in one position thereof and then downwardly therefrom and a connecting portion extending between the leg portions thereof parallel and adjacent to the auxiliary seat structure.

3. Seat structure comprising a seat base, seat bottom structure positioned on the seat base, seat back structure pivotally supported on the seat base for movement between a substantially vertical position and a substantially horizontal position in alignment with the seat bottom structure, auxiliary seat structure pivotally mounted on the seat back structure for movement between a substantially vertical position behind the seat back structure and a substantially horizontal position in alignment with the seat bottom structure and seat back structure in the horizontal position thereof, support means for the auxiliary seat structure secured to the auxiliary seat structure, and means operable between the seat base, seat bottom structure and seat back structure for pivoting the seat bottom structure about the front lower edge thereof to raise the back of the bottom seat structure and for moving the seat bottom structure toward the seat back structure on movement of the seat back structure into the horizontal position thereof.

4. Seat structure comprising a seat base, seat bottom structure positioned on the seat base, seat back structure pivotally supported on the seat base for movement between a substantially vertical position and a substantially horizontal position in alignment with the seat bottom structure, auxiliary seat structure pivotally mounted on the seat back structure for movement between a substantially vertical position behind the seat back structure and a substantially horizontal position in alignment with the seat bottom structure and seat back structure in the horizontal position thereof, support means for the auxiliary seat structure secured to the auxiliary seat structure, including a U-shaped support member, the legs of which are bent at an angle of substantially 90° and are pivotally secured at their ends to the auxiliary seat structure for pivotal movement between a position extending along the bottom of the auxiliary seat structure in a horizontal position and then downwardly substantially perpendicularly thereto and a position in which the legs of the support member extend substantially parallel to the auxiliary seat structure in a vertical position and then horizontally over one end of the auxiliary seat structure.

5. Structure as set forth in claim 4, and further including linkage means pivotally connected to the seat back structure and the support means for bracing the seat back structure against undesired movement out of the vertical position thereof with the seat back structure in the vertical position thereof and for guiding the support means during movement of the seat back structure and auxiliary seat structure between the vertical and horizontal positions thereof.

6. Seat structure comprising a seat base, seat bottom structure positioned on the seat base, seat back structure pivotally supported on the seat base for movement between a substantially vertical position and a substantially horizontal position in alignment with the seat bottom structure, auxiliary seat structure pivotally mounted on the seat back structure for movement between a substantially vertical position behind the seat back structure and a substantially horizontal position in alignment with the seat bottom structure and seat back structure in the horizontal position thereof, and support means for the auxiliary seat structure secured to the auxiliary seat structure including a generally U-shaped member rigidly secured to the auxiliary seat structure having legs at each side of the seat extending downwardly from the auxiliary seat structure with the auxiliary seat structure in a substantially horizontal position and pivot means connecting the free ends of the legs of the U-shaped member to the seat back structure and a connecting portion extending between the leg portions parallel and adjacent to the auxiliary seat structure.

7. Seat structure comprising a seat base, seat bottom structure positioned on the seat base, sent back structure pivotally supported on the seat base for movement between a substantially vertical position and a substantially horizontal position in alignment with the seat bottom structure auxiliary seat structure pivotally mounted on the seat back structure for free swinging pivotal movement between a substantially vertical position behind the seat back structure and a substantially horizontal position in alignment with the seat bottom structure and seat back structure in the horizontal position thereof, support means for the auxiliary seat structure secured to the auxiliary seat strucure and further including latching means pivotally operable between the seat base and support means for the auxiliary seat structure to automatically, releasably locking the auxiliary seat structure in the substantially vertical position thereof in response to movement of the auxiliary seat structure into the vertical position thereof.

8. Structure as set forth in claim 7, wherein the latching means comprises an elongated rod, one end of which is secured to the seat base at one side of the seat and the other end of which is rotatable about the longitudinal axis thereof at the other side of the seat base and a latch secured to the elongated rod for angular movement about the longitudinal axis of the rod on rotation of the other end of the rod and a locking lug secured to the support structure automatically, releasably engageable with the latch on pivoting of the auxiliary seat structure into the substantially vertical position thereof.

9. Seat structure comprising a seat base, seat bottom structure positioned on the seat base, seat back structure pivotally supported on the seat base for movement between a substantially vertical position and a substantially horizontal position in alignment with the seat bottom structure, auxiliary seat structure pivotally mounted on the seat back structure for free swinging pivotal movement between a substantially vertical position behind the seat back structure and a substantially horizontal position in alignment with the seat bottom structure and seat back structure in the horizontal position thereof, support means for the auxiliary seat structure secured to the auxiliary seat structure and linkage means pivotally connected directly to the seat back structure and the support means for bracing the seat back structure against undesired movement out of the vertical position thereof with the seat back structure in the vertical position thereof and for guiding the support means during movement of the seat back structure and auxiliary seat structure between the vertical and horizontal positions thereof.

10. Seat structure comprising a seat base, seat bottom structure positioned on the seat base, seat back structure pivotally supported on the seat base for movement between a substantially vertical position and a substantially horizontal position in alignment with the seat bottom structure, auxiliary seat structure pivotally mounted on the seat back structure for free swinging pivotal movement between a substantially vertical position behind the seat back structure and a substantially horizontal position in alignment with the seat bottom structure and seat back structure in the horizontal position thereof, support means for the auxiliary seat structure secured to the auxiliary seat structure and means operable between the seat base, seat bottom structure and seat back structure for pivoting the seat bottom structure about the front lower edge thereof to raise the back of the seat bottom structure and for moving the seat bottom structure toward the seat back structure on movement of the seat back structure into the horizontal position thereof including an extension on the seat back structure in engagement with the seat bottum structure at the lower rear edge thereof, a bracket secured to the seat base in a lost motion connection and engaging the seat bottom structure permitting limited movement of the seat bottom structure in a horizontal direction and pivotal movement of the seat bottom cushion about the front lower edge thereof and resilient means operable between the seat base and seat bottom structure urging the seat bottom structure toward the seat back structure and into engagement with the bracket.

11. Seat structure comprising a seat base, seat bottom structure positioned on the seat base, seat back structure pivotally supported on the seat base for movement between a substantially vertical position and a substantially horizontal position in alignment with the seat bottom structure, auxiliary seat structure pivotally mounted on the seat back structure for free swinging pivotal movement between a substantially vertical position behind the seat back structure and a substantially horizontal position in alignment with the seat bottom structure and seat back structure in the horizontal position thereof, support means for the auxiliary seat structure secured to the auxiliary seat structure and linkage means pivotally connected directly to the seat back structure and the support means for bracing the seat back structure against undesired movement out of the vertical position thereof with the seat back structure in the vertical position thereof and for guiding the support means during movement of the seat back structure and auxiliary seat structure between the vertical and horizontal positions thereof including a U-shaped support member, the legs of which are bent at an angle of substantially 90° and are pivotally secured at their ends to the auxiliary seat structure for pivotal movement between a position extending along the bottom of the auxiliary seat structure in a horizontal position and then downwardly substantially perpendicularly thereto and a position in which the legs of the support member extend substantially parallel to the auxiliary seat structure in a vertical position and then horizontally over one end of the auxiliary seat structure wherein the support means further includes a lost motion bracket secured to one leg of the support member having an elongated slot therein and the linkage means includes a link pivotally connected to the seat back structure at one end thereof and pivotally connected to the lost motion bracket in the slot thereof at the other end to guide the seat back structure, auxiliary seat structure and support means in movement from substantially vertical positions to substantially horizontal positions and to provide a brace for the seat back structure in the vertical position thereof.

* * * * *